(12) United States Patent
Deliwala

(10) Patent No.: US 6,879,751 B2
(45) Date of Patent: Apr. 12, 2005

(54) METHOD AND APPARATUS FOR ALTERING THE EFFECTIVE MODE INDEX OF AN OPTICAL WAVEGUIDE

(75) Inventor: Shrenik Deliwala, Orefield, PA (US)

(73) Assignee: SiOptical, Inc., Allentown, PA (US)

( * ) Notice: Subject to any disclaimer, the term of this patent is extended or adjusted under 35 U.S.C. 154(b) by 6 days.

(21) Appl. No.: 10/354,155

(22) Filed: Jan. 29, 2003

(65) Prior Publication Data

US 2003/0165288 A1 Sep. 4, 2003

Related U.S. Application Data

(60) Provisional application No. 60/352,817, filed on Jan. 30, 2002.

(51) Int. Cl.[7] .................. G02B 6/26; G02B 6/42; G02B 6/12; G02B 6/10
(52) U.S. Cl. .................. 385/25; 385/14; 385/131
(58) Field of Search .................. 385/1, 2, 4, 6, 385/8, 14, 25, 129–132

(56) References Cited

U.S. PATENT DOCUMENTS

| | | |
|---|---|---|
| 6,389,189 B1 | 5/2002 | Edwards et al. |
| 2003/0003735 A1 * | 1/2003 | Deliwala ............ 438/689 |
| 2003/0003736 A1 * | 1/2003 | Delwala ............ 438/689 |
| 2003/0003737 A1 * | 1/2003 | Delwala ............ 438/689 |

* cited by examiner

*Primary Examiner*—Akm Enayet Ullah
*Assistant Examiner*—Kevin S. Wood

(57) ABSTRACT

An effective index modifier that modifies light propagation in a waveguide. The device is formed on a wafer, such as a Silicon-On-Insulator (SOI) wafer that includes an insulator layer and an upper silicon layer. A waveguide is formed at least in part in the upper silicon layer of the SOI wafer. The waveguide guides an optical signal by total internal reflection. At least one micro-mechanical system (MEMS) having at least one movable component is disposed a positive distance away from the waveguide. Application of voltage to the MEMS results in a variation of the distance between the moveable component and the waveguide, which in turn alters the effective index of the waveguide in a location proximate the moveable object, thereby resulting in modification of light propagation in the waveguide.

12 Claims, 6 Drawing Sheets

METHOD AND APPARATUS FOR ALTERING THE EFFECTIVE MODE INDEX OF AN OPTICAL WAVEGUIDE

CROSS-REFERENCE TO RELATED APPLICATIONS

This application claims priority to U.S. Provisional Patent Application Ser. No. 60/352,817 entitled "Method And Apparatus For Altering Effective Mode Index Of Waveguide," filed Jan. 30, 2002, incorporated herein in its entirety by reference.

FIELD OF THE INVENTION

This invention relates to optical waveguide devices, and more particularly to semiconductor optical waveguide devices.

BACKGROUND OF THE INVENTION

In the integrated circuit industry, there is a continuing effort to increase device speed and increase device densities. In addition, manufacturers continue to search for technologies that can be used to implement optical functions at low cost.

Prior U.S. patent application Ser. No. 10/146,351, filed May 15, 2002, Ser. No. 09/991,542, filed Nov. 10, 2001, and Ser. No. 09/859,693, filed May 17, 2001, each of which is owned by the assignee of the present application and herein incorporated by reference, describe various optical components that can be formed at low cost on semiconductor wafers using standard CMOS processing techniques. In these prior applications, an electrode was used to project a region of altered propagation constant into a semiconductor waveguide in order to achieve a given optical function. The present application describes still further optical systems that can be formed on semiconductor wafers.

SUMMARY OF THE INVENTION

The present invention is directed to an effective index modifier that modifies light propagation in a waveguide. The device is formed on a wafer, such as a Silicon-On-insulator (SOI) wafer that includes an insulator layer and an upper silicon layer. A waveguide is formed at least in part in the upper silicon layer of the SOI wafer. The waveguide guides an optical signal by total internal reflection. At least one micro-electro-mechanical system (MEMS) having at least one movable component is disposed a positive distance away from the waveguide. Application of voltage to the MEMS results in a variation of the distance between the moveable component and the waveguide, which in turn alters the effective mode index of the waveguide in a location proximate to the moveable object by virtue of the evanescent optical field, thereby resulting in modification of light propagation in the waveguide.

In one embodiment, the moveable component is moveable along a first axis that is normal to the plane of the wafer. The moveable component can also be made to be moveable in a plane that is parallel to the wafer plane and that is perpendicular to the first axis. In a still further embodiment, the moveable component is made to be moveable in a plane that is parallel to the wafer plane, and can be made to rotate about the first axis that is perpendicular to the wafer plane.

The shape of the moveable component can be varied in order to implement different optical functions. For example, the moveable component can alternatively be formed in the shape of optical lenses, prisms, Echelle lenses or gratings, etc., in order to implement corresponding optical functions using the present invention.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain features of the invention.

Throughout the figures, unless otherwise stated, the same reference numerals and characters denote like features, elements, components, or portions of the illustrated embodiments.

DETAILED DESCRIPTION OF THE PREFERRED EMBODIMENT

Figure 1:
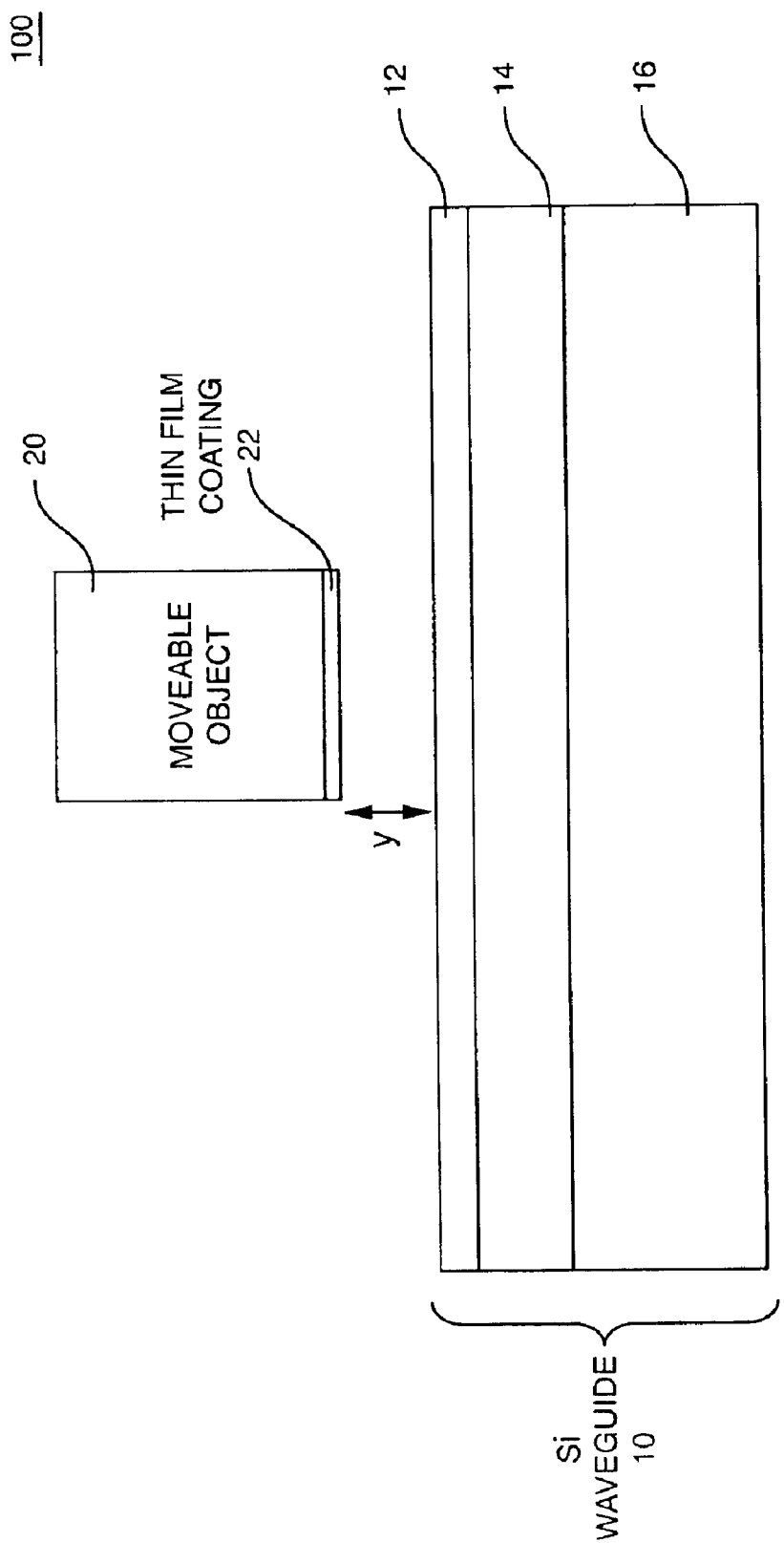
FIG. 1 shows a side view of an effective index modifier, in accordance with the present invention.

Referring now to FIG. 1, there is shown a side cross-sectional view of an effective mode index modification system 100, in accordance with the present invention. In one embodiment, system 100 is formed using a silicon-on-insulator (SOI) wafer 10. Wafer 10 includes an insulator layer 14, e.g., glass. An upper silicon layer 12 is disposed above the insulator layer 14. Lower silicon layer 16 is positioned below insulator layer 14. In one embodiment, SOI wafer 10 is a thin SOI wafer, such that upper silicon layer 12 has a thickness that is about 70 nm.

In the present invention, upper silicon layer 12 acts as a waveguide that limits the locations in which light can diffract within wafer 10. The waveguide guides light by total internal reflection. Making the upper silicon layer 12 thin, acts to localize the light to a relatively narrow waveguide. Various systems for coupling optical signals into and out of waveguide 12 are shown in U.S. patent application Ser. No. 10/146,351, filed May 15, 2002, which is assigned to the assignee of the present invention, and incorporated herein in its entirety by reference.

Effective mode index modification system 100 also includes a movable object 20, which in the preferred embodiment, is formed as a micro-electro-mechanical systems (MEMS). MEMS device movable object 20 comprises a material (for example, polysilicon, silicon nitride, doped glass or a polymer) and optionally includes a thin film coating 22. As discussed in the co-pending application Ser. No. 010/146,351, the evanescent electrical field penetrating outside of a silicon waveguide can be perturbed by bringing a component near the waveguide. In accordance with the present invention, the same principle is used to manipulate the optical mode in the waveguide. When a MEMS movable object is brought in the vicinity of the waveguide surface, the optical mode propagating in the waveguide experiences a perturbation as a function of the distance between the movable object and the waveguide, the shape of the movable object, and the respective refractive indexes of both elements. Thus, the optical mode behavior in the waveguide can be modified using this MEMS movable object to achieve various functionalities. Applications of this effect are known in the art, for example, the waveguide investigation performed using a near-field scanning optical microscope (NSOM) is based upon the principle of probing the evanescent field. Additionally, several chemical and biological sensors are based upon evanescent field interaction. In the embodiment shown in FIG. 1, MEMS device movable object 20 is movable along vertical axis "Y". As explained more fully below, as the distance between the base of movable object 20 and waveguide 12 varies, the effective mode index within the portion of waveguide 12 proximate to movable object 20 varies. Thus, by selectively applying a voltage to the MEMS, the present invention is able to selectively displace movable object 20 with respect to waveguide 12, thereby altering the effective mode index within waveguide 12 at a location proximate the movable object 20. One or more capacitive sensors (not shown), can optionally be used to level movable object 20 with respect to the plane of waveguide 12, and accurately position movable object 20 with respect to waveguide 12.

Figure 2A:
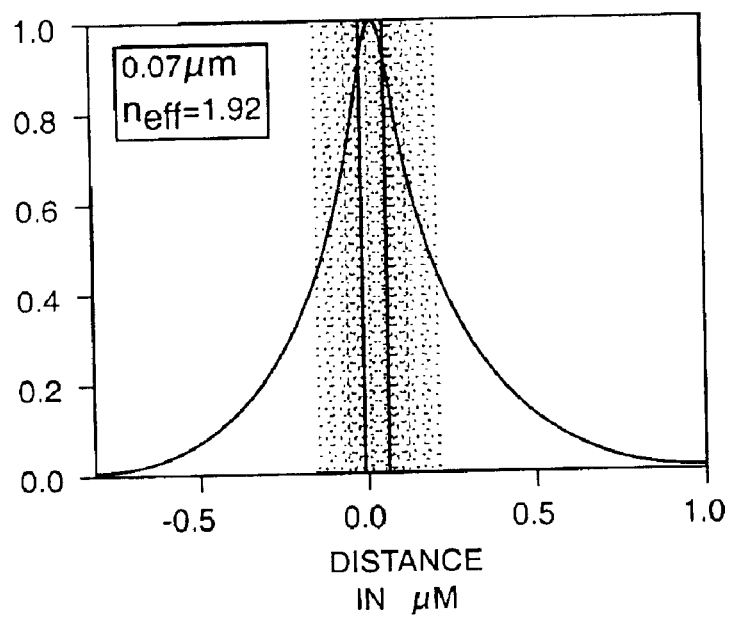
FIGS. 2A, 2B are graphs illustrating how the effective mode of a semiconductor waveguide varies as the distance between a moveable object and the waveguide varies, in accordance with the present invention.
Figure 2B:
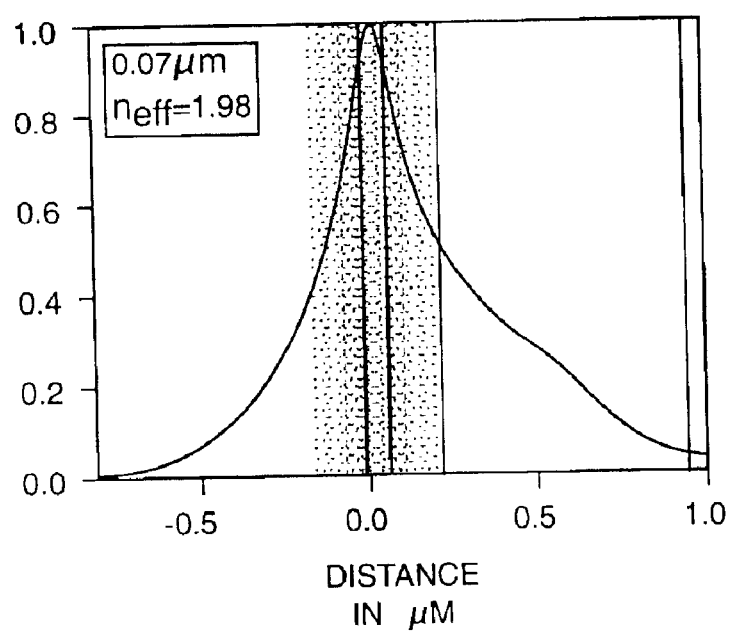

Referring now to FIGS. 2A, 2B, there are shown two diagrams which illustrate the change in effective mode index within waveguide 12, as a function of the distance between the moveable object 20 and the waveguide 12. FIG. 2A illustrates the effective mode index of a waveguide that is 70 nanometers in thickness when a moveable object having an exemplary thickness of 400 nanometers is relatively further away from the waveguide. As shown in FIG. 2B, when the same movable object is brought closer to the waveguide, the effective mode index within the waveguide changes from 1.92 to 1.98.

Figure 3:
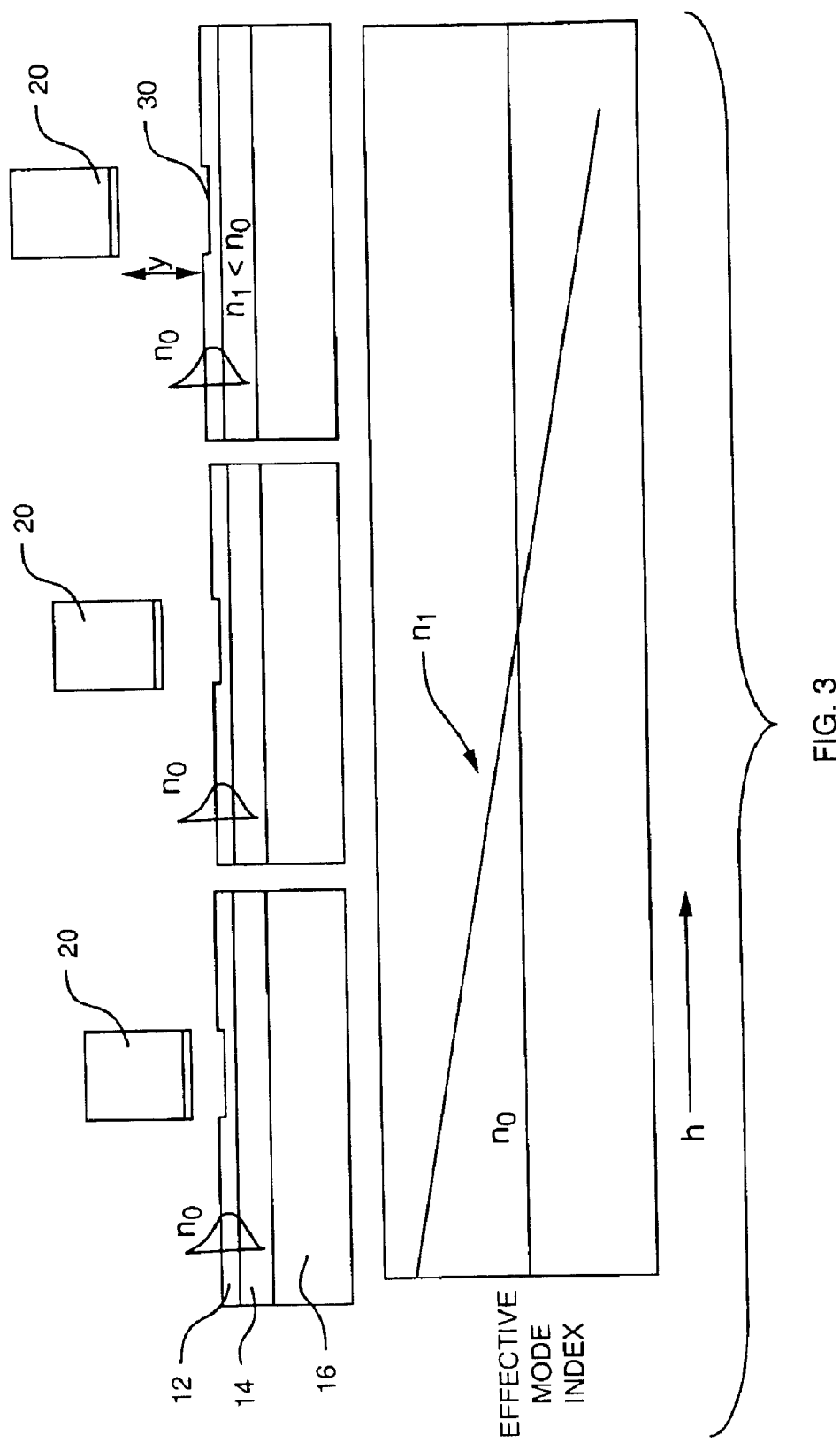
FIG. 3 is a further diagram illustrating how the effective mode of a semiconductor waveguide varies as the distance between a moveable object and the waveguide varies, in accordance with the present invention.

Referring now to FIG. 3, there is shown a diagram further illustrating how the effective mode index within waveguide 12 varies as the distance between movable object 20 and waveguide 12 changes. As shown in FIG. 3, the effective mode index ($n_1$) within waveguide 12 decreases with respect to the nominal slab index ($n_0$) as the distance between waveguide 12 and movable object 20 increases. A trench 30 may be patterned into the upper surface of waveguide 12. In one example, trench 30 has a width that generally corresponds to the width of movable object 20.

Figure 4A:
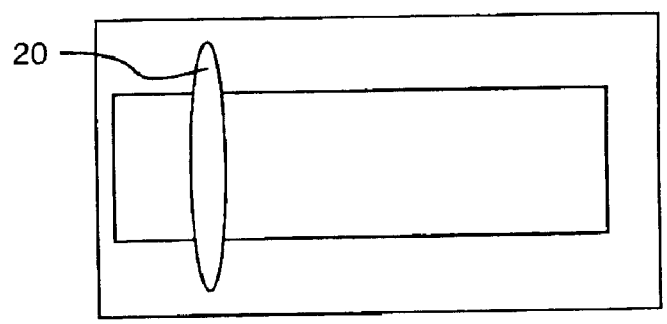
FIGS. 4A, 4B, 4C illustrate how the effective index modifier of the present invention can be used to implement a variable focal-length lens, in accordance with the present invention.
Figure 4B:
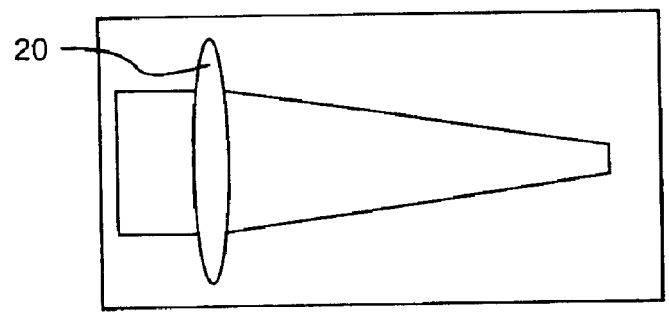

In further embodiments, movable object 20 may be given a specific shape, in order for system 100 to perform a given optical function. For example, in FIGS. 4A–4C, movable object 20 is lens-shaped. When lens-shaped movable object 20 is a certain prescribed distance away from waveguide 12, (as shown in FIG. 4A), no focusing of light occurs. As lens-shaped movable object 20 moves to a second prescribed distance away from waveguide 12 (as shown in FIG. 4B), the system acts to focus light in accordance with a relatively long focal-length. Finally, as lens-shaped movable object 20 moves to a third-prescribed distance away from waveguide 12, the system functions to focus light in accordance with a relatively shorter focal-length. Thus, as shown, FIGS. 4A–4C, by selectively applying a voltage to MEMS 20, the present invention is able to selectively displace moveable object 20 with respect to waveguide 12, in order to implement a variable focal-length lens.

Figure 5:
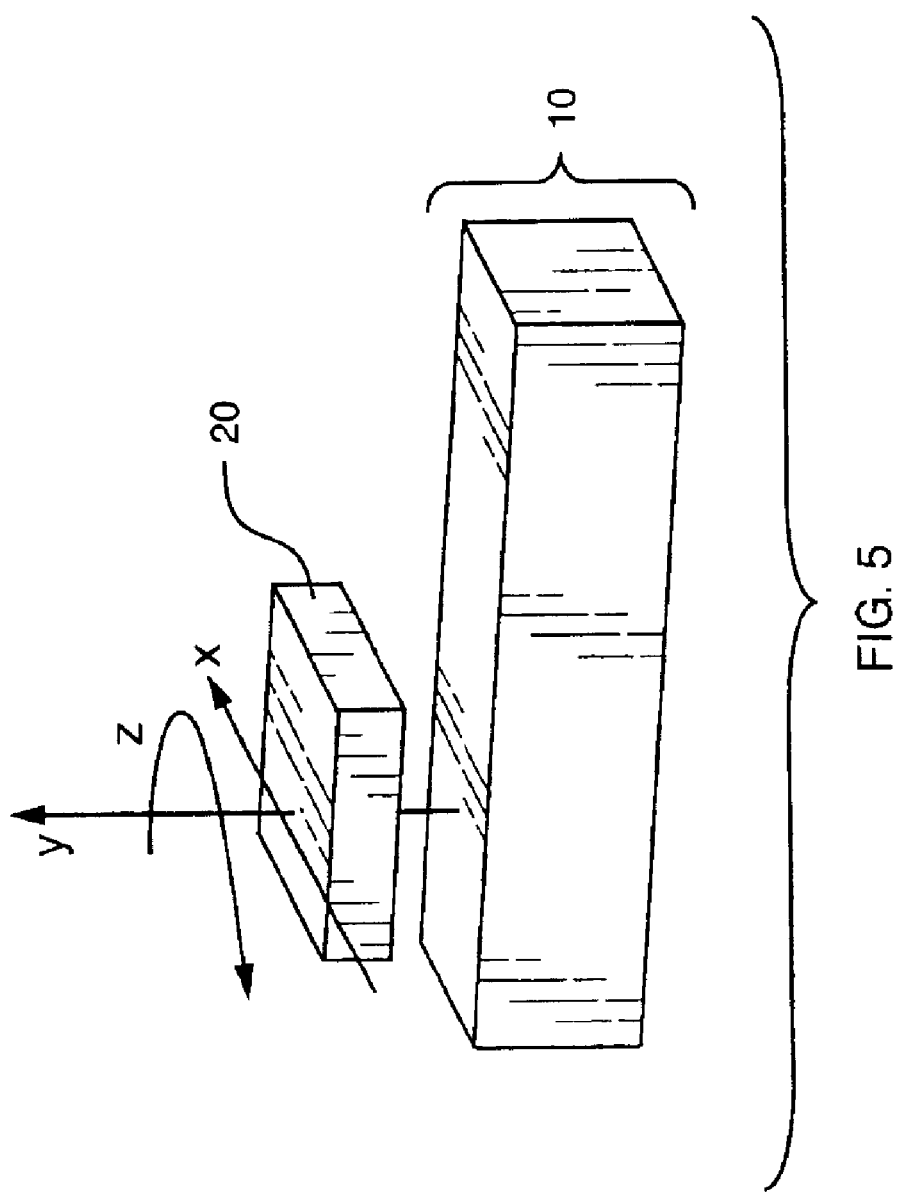
FIG. 5 illustrates various degrees of motion for the moveable object of the present invention.

Although in FIG. 1, movable object 20 is shown as moving only along one axis, it will be understood by those of ordinary skill in the art that, using standard MEMS technology, movable object 20 can be fabricated and controlled so as to move along either the X or Y axis, or in a rotational manner as shown by arrow Z in FIG. 5. Peizo-electric transducers could also be used to control the movement of object 20.

Figure 4C:
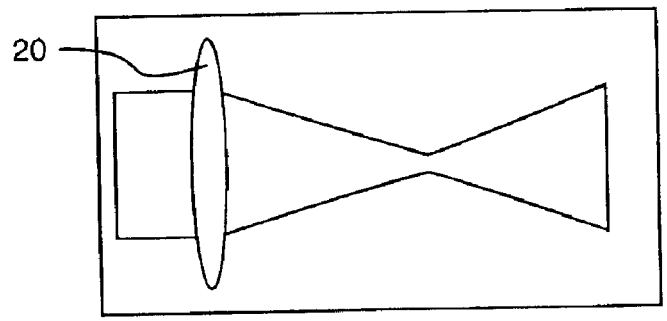

In addition to the lens-shaped movable object 20 shown in FIGS. 4A–4C, movable object 20 can be formed from other shapes in order to implement various optical functions. For example, movable object 20 can be shaped in the form of prisms, Echelle lenses or gratings, etc.

Figure 6B:
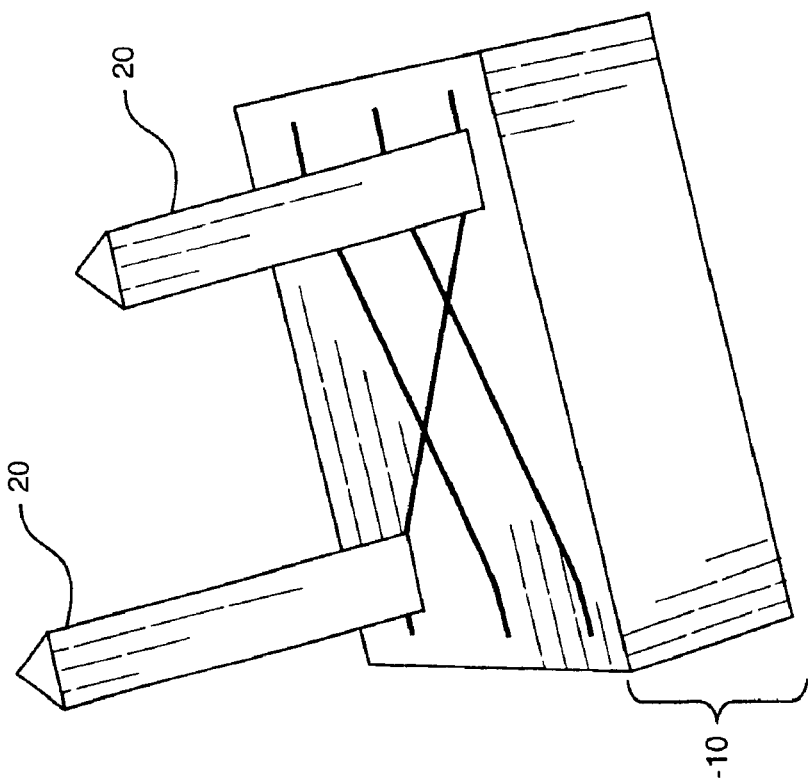
FIGS. 6A, 6B illustrate an optical switch that is formed by locating a plurality effective mode index modifier devices on a common slab semiconductor substrate, in accordance with the present invention.
Figure 6A:
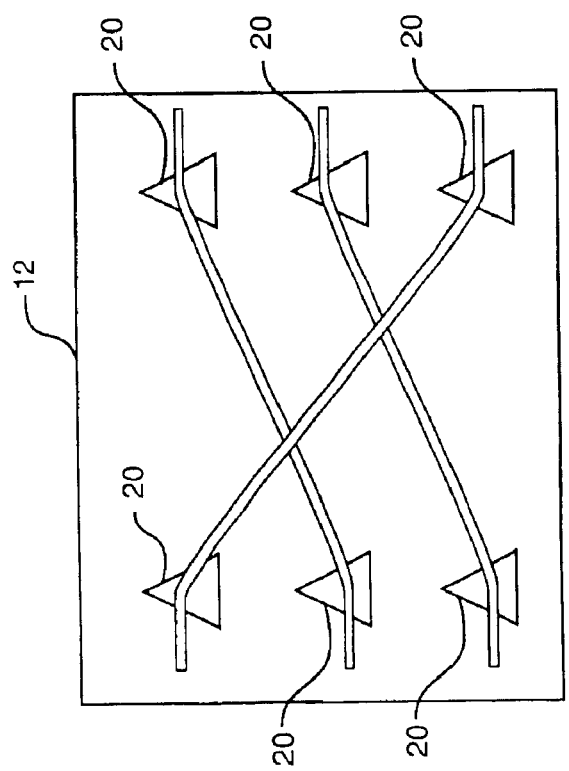

System 100, including SOI wafer 10 and MEMS device 20, can be fabricated using well known CMOS processing techniques. Accordingly, using the present invention, multiple MEMS objects 20 may be positioned at different locations proximate a single SOI wafer 10, in order to form more complicated optical devices. For example, an optical switch formed in this manner is shown in FIGS. 6A, 6B. The waveguide 12 shown in FIG. 6A corresponds to a slab waveguide formed from the upper silicon layer of a single SOI wafer. Each of the movable objects 20 shown in FIG. 6A corresponds to a MEMS device 20 which may be independently controlled. In addition, each movable object 20 is patterned in a triangular shape, so as to achieve a deflection function as the distance between a given movable object and waveguide 12 varies. Using this arrangement, it will be readily understood that the present invention may be used to implement an optical switch.

While the principles of the invention have been described above in connection with the specific apparatus and associated methods set forth above, it is to be clearly understood that the above description is made only by way of example and not as a limitation on the scope of the invention as defined in the appended claims.

What is claimed is:

1. An effective mode index modifier that modifies light propagation in a waveguide, comprising:
   a Silicon-On-Insulator (SOI) wafer that includes an insulator layer and an upper silicon layer;
   a waveguide formed at least in part in the upper silicon layer of the SOI wafer, wherein the waveguide guides an optical signal by total internal reflection;
   at least one micro-electro-mechanical system (MEMS) having at least one movable component disposed a positive distance away from the waveguide;
   wherein application of voltage to the MEMS results in a variation of the distance between the at least one movable component and the waveguide, which in turn alters the effective mode index of the waveguide in a location proximate to the at least one movable component moveable object, thereby resulting in modification of light propagation in the waveguide.

2. The effective mode index modifier of claim 1, wherein the at least one movable component is movable along a first axis that is normal to a plane of the wafer.

3. The effective mode index modifier of claim 1, wherein the at least one movable component is movable throughout a second plane that is parallel to the plane of the wafer and perpendicular to the first axis.

4. The effective mode index modifier of claim 3, wherein the at least one movable component is able to rotate about the first axis.

5. The effective mode index modifier of claim 3, wherein the at least one movable component is able to rotate about a third axis that is perpendicular to the plane of the wafer.

6. The effective mode index modifier of claim 1, wherein the at least one movable component has a shape that corresponds to a shape of a lens.

7. The effective mode index modifier of claim 6, wherein the at least one movable component has a shape that corresponds to a prism.

8. The effective mode index modifier of claim 7, wherein the at least one movable component is movable along a first axis that intersects said upper silicon layer.

9. An effective mode index modifier that modifies light propagation in a waveguide, comprising:

a wafer that includes an insulator layer and an upper silicon layer;

a waveguide formed at least in part in the upper silicon layer of the wafer, wherein the waveguide guides an optical signal by total internal reflection;

at least one micro-electro-mechanical system (MEMS) having at least one movable component, the at least one movable component disposed a positive distance away from the waveguide;

wherein application of voltage to the MEMS results in a variation of the distance between the at least one movable component and the waveguide, which in turn alters the effective mode index of the waveguide in a location proximate to the at least one movable component, thereby resulting in modification of light propagation in the waveguide.

10. A method for modifying light propagation in a waveguide, comprising the steps of:

providing a Silicon-On-Insulator (SOI) wafer that includes an insulator layer and upper silicon layer, and a waveguide formed at least in part in the upper silicon layer of the SOI wafer, wherein the waveguide guides an optical signal by total internal reflection, and at least one micro-electra-mechanical system (MEMS) having at least one movable component comprising a material having a refractive index less than the refractive index of silicon, the at least one movable component disposed a positive distance away from the waveguide; and applying a voltage to the MEMS which results in a variation of the distance between the at least one movable component and the waveguide, which in turn alters an effective mode index of the waveguide in a location proximate to the at least one movable component, thereby resulting in modification of light propagation in the waveguide.

11. A method for modifying light propagation in a waveguide, comprising the steps of:

providing a wafer that includes an insulator layer and upper silicon layer, and a waveguide formed at least in part in the upper silicon layer of the SOI wafer, wherein the waveguide guides an optical signal by total internal reflection, and at least one micro-electra-mechanical system (MEMS) having at least one movable component disposed a positive distance away from the waveguide; and applying a voltage to the MEMS which results in a variation of the distance between the at least one movable component and the waveguide, which in turn alters an effective mode index of the waveguide in a location proximate to the at least one movable component, thereby resulting in modification of light propagation in the waveguide.

12. The effective mode index modifier of claim 6, wherein the at least one movable component has a shape that corresponds to a grating.

* * * * *